US010841599B2

(12) United States Patent
Rosewarne

(10) Patent No.: US 10,841,599 B2
(45) Date of Patent: Nov. 17, 2020

(54) METHOD, APPARATUS AND SYSTEM FOR ENCODING VIDEO DATA FOR SELECTED VIEWING CONDITIONS

(71) Applicant: CANON KABUSHIKI KAISHA, Tokyo (JP)

(72) Inventor: Christopher James Rosewarne, Concord West (AU)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 15/219,147

(22) Filed: Jul. 25, 2016

(65) Prior Publication Data

US 2017/0034520 A1 Feb. 2, 2017

(30) Foreign Application Priority Data

Jul. 28, 2015 (AU) .................................. 2015207818

(51) Int. Cl.
*H04N 19/169* (2014.01)
*H04N 19/172* (2014.01)
(Continued)

(52) U.S. Cl.
CPC ......... *H04N 19/1887* (2014.11); *G06T 5/009* (2013.01); *H04N 19/172* (2014.11);
(Continued)

(58) Field of Classification Search
CPC .... H04N 19/1887; H04N 19/85; H04N 19/68; H04N 19/172; G06T 5/009; G06T 2207/20208
See application file for complete search history.

(56) References Cited

U.S. PATENT DOCUMENTS 8,531,379 B2 * 9/2013 Kerofsky ............. G09G 3/3607
345/102
8,988,552 B2 * 3/2015 Atkins ................. G09G 3/3413
348/229.1
(Continued)

FOREIGN PATENT DOCUMENTS

WO WO-2015007505 A1 * 1/2015 ........... H04N 5/2355

OTHER PUBLICATIONS

U.S. Appl. No. 61/433,454, Anders Ballestad.

*Primary Examiner* — Richard A Hansell, Jr.
(74) *Attorney, Agent, or Firm* — Canon U.S.A., Inc. IP Division

(57) ABSTRACT

A method for encoding video data into a video bitstream using a video capture device having a brightness range limited output determines capture conditions for the capture device, the capture conditions including an ambient capture light level and a measured light level of captured video data. The method adjusts a brightness adaptation model using at least the measured light level and the ambient capture light level, the brightness adaption model defining a temporally variable peak luminance for a viewer of video captured using the capture device, and then determines a tone map such that where the measured light level exceeds a determined maximum light level the tone map is modified to reduce brightness, the maximum light level is determined using the brightness adaptation model. The captured video data is then encoded into the video bitstream using the determined tone map.

20 Claims, 9 Drawing Sheets

(51) Int. Cl.
*H04N 19/68* (2014.01)
*H04N 19/85* (2014.01)
*G06T 5/00* (2006.01)

(52) U.S. Cl.
CPC ............ *H04N 19/68* (2014.11); *H04N 19/85* (2014.11); *G06T 2207/20208* (2013.01)

(56) References Cited

U.S. PATENT DOCUMENTS

| | | | | |
|---|---|---|---|---|
| 2012/0182278 | A1* | 7/2012 | Ballestad | G01J 1/4204 |
| | | | | 345/207 |
| 2012/0218282 | A1* | 8/2012 | Choboter | G09G 5/00 |
| | | | | 345/589 |
| 2014/0218416 | A1* | 8/2014 | Suzuki | G09G 5/10 |
| | | | | 345/690 |
| 2015/0078661 | A1* | 3/2015 | Granados | G06T 5/009 |
| | | | | 382/167 |
| 2016/0165256 | A1* | 6/2016 | Van Der Vleuten | H04N 19/46 |
| | | | | 375/240.01 |
| 2016/0358584 | A1* | 12/2016 | Greenebaum | G06T 11/001 |
| 2017/0034519 | A1* | 2/2017 | Rosewarne | H04N 19/85 |
| 2017/0062005 | A1* | 3/2017 | Kolesnikov | H04N 5/58 |
| 2017/0116963 | A1* | 4/2017 | Wanat | G09G 5/10 |
| 2017/0155903 | A1* | 6/2017 | Rosewarne | H04N 19/159 |
| 2017/0238062 | A1* | 8/2017 | Oh | H04N 21/6106 |
| | | | | 725/116 |
| 2018/0068637 | A1* | 3/2018 | Ninan | G09G 5/10 |

\* cited by examiner

METHOD, APPARATUS AND SYSTEM FOR ENCODING VIDEO DATA FOR SELECTED VIEWING CONDITIONS

REFERENCE TO RELATED PATENT APPLICATION(S)

This application claims the benefit under 35 U.S.C. § 119 of the filing date of Australian Patent Application No. 2015207818, filed 28 Jul. 2015, hereby incorporated by reference in its entirety as if fully set forth herein.

TECHNICAL FIELD

The present invention relates generally to digital video signal processing and, in particular, to a method, apparatus and system for encoding video data intended for display under selected viewing conditions. The present invention also relates to a computer program product including a computer readable medium having recorded thereon a computer program for encoding video data intended for display under selected viewing conditions.

BACKGROUND

Contemporary digital video cameras that support capture of video data having a high dynamic range (HDR) are being released onto the market. At the same time, development of standards for conveying HDR video data and development of displays capable of displaying HDR video data is underway. Standards bodies such as International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG), the International Telecommunications Union—Radiocommunication Sector (ITU-R), and the Society of Motion Picture Television Experts (SMPTE) are investigating the development of standards for representation and coding of HDR video data. Companies such as Dolby and Sony are developing displays capable of displaying HDR video data.

HDR video data covers a range of intensities far beyond that used in traditional standard dynamic range (SDR) services. For example, the Perceptual Quantizer (PQ) Electro-Optical Transfer Function (EOTF), standardised as SMPTE ST.2084, is defined to support a peak luminance of up to 10,000 candela/metre$^2$ (nits), whereas traditional television services are defined with a 100 nit peak brightness (although more modern television sets increase the peak brightness beyond this). In practical use, the peak luminance is reduced to a lower level, e.g. 500 nits, 1K, 2K or 4K nits being common values, with the reduced peak signalled using the related standard SMPTE ST.2086. The human visual system (HVS) is capable of perceiving luminance levels covering an enormous range of intensities using a temporal adaptation mechanism. However, at a given point in time the range of perceptible luminance levels is much less than the full range of perceptible luminance levels, allowing adaptation of the HVS to ambient conditions. Generally, adapting to an increased luminance level occurs more rapidly (in the order of a few minutes to adapt from a dark room to outside sunlight) than adapting to a decreased luminance level (in the order of thirty minutes to adapt from outside sunlight to a dark room).

A common use case for consumer level video capture involves a camera operator capturing a scene for playback on a display, possibly subject to minor editing being performed, such as scene cuts. In such use cases, generally little or no colour grading is performed. Moreover, commonly no editing is performed at all, and the captured content is simply replayed using a display device. Problems may arise during playback, in that the range of luminance intensities (re)produced by an HDR display may exceed the comfortable limits for the HVS of the viewer adapted to prior ambient conditions.

SUMMARY

It is an object of the present invention to substantially overcome, or at least ameliorate, one or more disadvantages of existing arrangements.

According to one aspect of the present disclosure, there is provided a method for encoding video data into a video bitstream using a video capture device having a brightness range limited output, the method comprising:

determining capture conditions for the capture device, the capture conditions including an ambient capture light level and a measured light level of captured video data;

adjusting a brightness adaptation model using at least the measured light level and the ambient capture light level, the brightness adaption model defining a temporally variable peak luminance for a viewer of video captured using the capture device;

determining a tone map such that where the measured light level exceeds a determined maximum light level the tone map is modified to reduce brightness, the maximum light level is determined using the brightness adaptation model; and encoding captured video data into the video bitstream using the determined tone map.

Preferably the brightness adaptation model includes a viewing environment light level. Desirably the video bitstream includes metadata indicating the peak luminance.

Advantageously the brightness adaptation model includes a plurality of viewing environment light levels. In a specific implementation the video bitstream includes a plurality of metadata elements, each metadata element indicating the maximum brightness under one viewing environment light levels of the plurality of viewing environment light levels.

Desirably the capture device is a high dynamic range (HDR) digital video camera, and the brightness adaptation model is a human visual system (HVS) model.

Generally the encoding comprises: applying the tone map to the captured video data to form mapped image data; and encoding the mapped image data into the bitstream. Preferably the measured light level of the captured video data is derived from the mapped image data.

In another implementation a preselected viewing condition is selected at the video capture device before video capture to associate the captured video data with an expected reproduction environment in which the captured video data may be reproduced.

More desirably the determining of the tone map comprises at least one of:

forming a tone-map model to map the ambient capture light level obtained from a light sensor of the capture device to absolute luminance levels; and using the brightness adaptation parameter model to map absolute light levels to a range of light levels that accord with the preselected viewing condition.

The preselected viewing condition may be one of a plurality of viewing conditions each having associated light level preferably ranging from a most conservative level, corresponding to total darkness, to a most restrictive level in which a tone mapping rate of change never exceeds a threshold. Advantageously the tone mapping rate of change is limited when approaching the threshold.

The method may further comprise encoding the preselected viewing condition into the bitstream.

According to another aspect of the present disclosure, there is provided a method for encoding video data into a video bitstream using a video capture device having a brightness range limited output, the method comprising:

determining capture conditions for the capture device, the capture conditions including an ambient capture light level and a measured light level of captured video data;

adjusting a brightness adaptation model using at least the measured light level and the ambient capture light level, the brightness adaption model defining a temporally variable peak luminance for a viewer of video captured using the capture device;

determining a tone map such that where the measured light level exceeds a determined maximum light level the tone map is modified to reduce brightness, the maximum light level is determined using the brightness adaptation model; and encoding captured video data into the video bitstream along with metadata to encode the determined tone map.

In another aspect, disclosed is a non-transitory computer readable storage medium having a program recorded thereon, the program being executable by a processor of a video capture device, having a brightness range limited output, to encode video data into a video bitstream, the program comprising code to perform the steps of the methods.

In yet another aspect, disclosed is a video capture device having a brightness range limited output, the video capture device comprising: a determination arrangement for determining capture conditions for the capture device, the capture conditions including an ambient capture light level and a measured light level of captured video data; an adjusting unit for adjusting a brightness adaptation model using at least the measured light level and the ambient capture light level, the brightness adaption model defining a temporally variable peak luminance for a viewer of video captured using the capture device; a modeller for determining a tone map such that where the measured light level exceeds a determined maximum light level the tone map is modified to reduce brightness, the maximum light level is determined using the brightness adaptation model; and an encoder for encoding captured video data into the video bitstream using the determined tone map.

Desirably the brightness adaptation model includes at least one viewing environment light level, and the video bitstream includes metadata indicating the peak luminance, and the video bitstream includes at least one metadata element, each metadata element indicating the maximum brightness under one viewing environment light levels of the viewing environment light levels.

Preferably the encoding comprises: applying the tone map to the captured video data to form mapped image data; and encoding the mapped image data into the bitstream; and the measured light level of the captured video data is derived from the mapped image data.

Advantageously a preselected viewing condition is selected at the video capture device before video capture to associate the captured video data with an expected reproduction environment in which the captured video data may be reproduced.

In a most specific implementation, the determining of the tone map comprises at least one of: forming a tone-map model to map the ambient capture light level obtained from a light sensor of the capture device to absolute luminance levels; and using the brightness adaptation parameter model to map absolute light levels to a range of light levels that accord with the preselected viewing condition; wherein the preselected viewing condition is one of a plurality of viewing conditions each having associated light level preferably ranging from a most conservative level, corresponding to total darkness, to a most restrictive level in which a tone mapping rate of change never exceeds a threshold; and wherein the tone mapping rate of change is limited when approaching the threshold.

Generally the encoder encodes the preselected viewing condition into the bitstream. In a specific implementation, the captured video data is encoded into the video bitstream along with metadata that encodes the determined tone map.

Other aspects are also disclosed.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
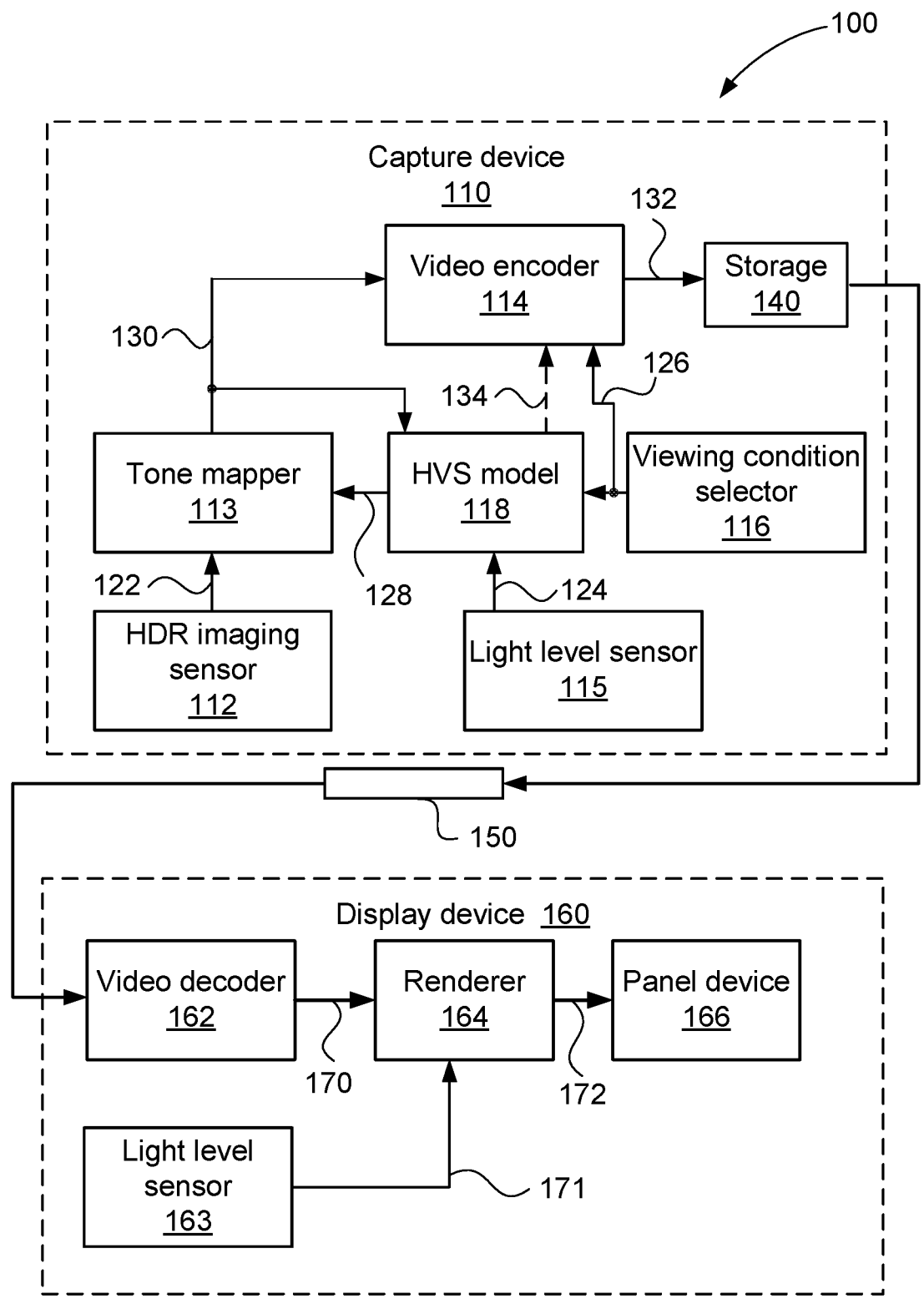
FIG. 1 is a schematic block diagram showing a video capture and reproduction system.

Where reference is made in any one or more of the accompanying drawings to steps and/or features, which have the same reference numerals, those steps and/or features have for the purposes of this description the same function (s) or operation(s), unless the contrary intention appears.

FIG. 1 is a schematic block diagram showing functional modules of a video capture and reproduction system 100. The system 100 includes a capture device 110, such as a digital video camera, a display device 160, and a communication channel 150 interconnecting the two. The capture device 110 operates in a capture environment to capture video data. Generally, the capture device 110 operates at a separate location (and time) to the display device 160. As such, the system 100 generally includes separate devices operating at different times and locations. Moreover, the viewing conditions at the display device 160 are generally not available to the capture device 110.

The capture device 110 has a brightness range limited output, in that the range of codewords stored in a bitstream from the capture device 110 is restricted according to an internal model of the HVS of the end viewer of the captured video data. The capture device 110 includes a HDR imaging sensor 112, which is generally a complementary metal oxide semiconductor (CMOS) imaging sensor with a capability to receive a wider range of luminance levels than traditional SDR imaging sensors. The HDR imaging sensor 112 may also be realised using other technologies, such as charged coupled device (CCD) technology.

The HDR imaging sensor 112 produces an HDR image 122, containing HDR samples. Consecutively captured HDR images form video data. The HDR samples from the HDR imaging sensor 112 are representative of the light levels, e.g. in three colour channels and generally occupying a rectangular area. The HDR samples are generally in a 'linear' domain, representative of the luminance (physical level of light) in the scene, as opposed to a 'perceptual' domain, representative of human perception of light levels. As the HDR samples are representative of the light levels present in the capture environment, the HDR image 122 is considered a 'scene referred' image. The relationship between the linear light levels present at each sample location in the HDR imaging sensor 112 and the corresponding HDR sample value is known as an 'Optical Electro Transfer Function' (OETF). The OETF generally includes necessary scaling and offset parameters to accommodate various capture environments. An example OETF is included in the ITU-R BT.709 standard, as used for SDR television services. The HDR image 122 may be produced, e.g., by combining multiple SDR images (each image captured with a different exposure or 'ISO' setting) or from a single image having SDR samples, but with different samples within the image captured at different exposures.

The capture device 110 of FIG. 1 also includes a tone mapper 113. The tone mapper 113 applies a tone map 128 to HDR samples from the HDR image 122 to produce a mapped image 130. The mapped image 130 includes codewords representative of the measured or detected light levels in the HDR image 122 compressed in terms of amplitude in accordance with the tone map 128. The mapped image 130 is provided to a video encoder 114. The capture device 110 also includes a light level sensor 115. The light level sensor 115 is used to detect an ambient light level 124 in the capture environment. The ambient light level 124 is generally independent of the HDR image 122 captured by the HDR imaging sensor 112. For example, when the operator of the capture device 110 is panning within a room past a window with relatively bright external illumination, the ambient capture condition within the room has not changed, even though the light intensities detected by the HDR imaging sensor 112 will vary substantially.

The capture device 110 also includes a viewing condition selector 116. The viewing condition selector 116 is operable via a user interface (not illustrated) of the capture device 110 to select a targeted viewing condition 126 for the content currently being (or about to be) captured. Viewing conditions can include standardised conditions for viewing content, such as ITU-R BT.2022, which recommends general viewing conditions for subjective assessment of quality of SDTV and HDTV television pictures on flat panel displays. Other viewing conditions are also possible, depending on the nature of the content. For example, content intended to be replayed in an office environment or in an outdoor environment would have different ambient lighting conditions compared to a home environment. Generally, the white-point, ambient light level and viewing distance are parameters collectively referred to as the 'viewing conditions' of the 'viewing environment'. The white-point can be represented as X, Y chromaticity co-ordinates in a CIE 1931 colour space. The ambient light level can be represented as a light level in lux or in candela per square meter. The distance can be represented in meters. Although these parameters are independent, broadly a set of commonly used viewing conditions that capture most use cases for viewing video content can be defined. The cinema environment is another example of an environment, in this case a well specified and controlled environment, that differs substantially from other possible viewing environments. The viewing condition 126 may be directly selected via the user interface. Alternatively, the viewing condition 126 may be implied by a (predefined) setting of the capture device 110 that describes the usage scenario for the content being captured. In this regard, the user may operate a switch or other selector on the capture device 110 (video camera) to select one of a number of settings. One example of a setting is "Lounge Room—Day" which is desirably configured for a relatively large domestic space with reasonable natural light entering via windows and the like. Another could be "Lounge Room—Night" which may represent the same domestic space with some amount of artificial light. A further setting could be "Home Cinema" representing a dedicated domestic viewing space having none or substantially no natural light and no artificial light. Such an approach may be beneficial for non-expert operators of the capture device 110.

The capture device 110 of FIG. 1 also includes an HVS model 118. The HVS model 118 models aspects of the temporal adaptation of the HVS of the observer to the ambient conditions in the viewing environment. One aspect being modelled is the level of dark adaptation. Other aspects that can be modelled include adaptation to the 'white point' in the viewing environment. The white point is influenced by any illuminant present in the viewing environment. The color and brightness of objects in the room is perceived from light reflected off objects that originated from the illuminant. Thus, the colors perceived in a viewing environment are a combination of the reflectance of objects in the environment and the composition of the illuminant. Sources of light in the viewing environment include lighting in the room and the display device 160 by which the captured video is being reproduced. The HVS model 118 determines the tone map 128 and, in one implementation, viewing parameters 134, using the viewing condition 126, the ambient light level 124. The codewords 130 are generated effectively in real-time from the tone mapper 113 according to the tone map 128. The viewing parameters 134 include a maximum comfortable luminance level and are further described with reference to FIGS. 4 and 5. The viewing parameters 134 also include a minimum perceptible luminance level. In this fashion the HVS model 118 represents a brightness adaption model defining a temporally variable peak luminance acceptable for a viewer of the captured video. The HVS model 118 thus models what the user of the video camera capturing the video sequence wants an intended viewer of the video sequence to experience. The HVS model 118 is formed via the codewords 130 as a feedback loop and thus responds to the changing parameters of light during image sequence capture. The rate of update may be varied from a basic maximum of once per frame (and therefore 25 or 30 times per second depending upon the video standard) or alternatively averaged over a number of adjacent frames (e.g. 5-10 frames), giving approximately 3-5 updates per second. The length of any averaging may be selected to avoid jitter in the model (which may occur if updated for small numbers of frames, such as every 1 or 2 frames) and also to avoid long delays in updating the model which may have a deleterious effect on viewer comfort (e.g. 15-25 or 30 frames, approximately once per second, which is well within human perceptibility).

The capture device 110 includes a video encoder 114. The video encoder 114 encodes the mapped images 130 from the tone mapper 113 using the viewing parameters 134. The video encoder 114 produces an encoded bitstream 132. The encoded bitstream 132 is typically stored in a storage device 140 forming part of the capture device 110. The storage device 140 is non-transitory and can include a hard disk drive, electronic memory such as dynamic RAM, writeable optical disk or memory buffers. The encoded bitstream 132 may also be transmitted via the communication channel 150 from the storage device 140. In some implementations, the capture device 110 may be configured to directly transmit the encoded bitstream 132 without substantive local storage. The video encoder 114 also encodes a message into the encoded bitstream 132 that contains the viewing condition 126. Such a message is known as an 'ambient viewing parameter' message and indicates the intended viewing environment for playback of the encoded bitstream 132. The ambient viewing parameter message is generally coded as a supplementary enhancement information (SEI) message in the encoded bitstream 132.

Prior to encoding, samples associated with the HDR image 122 from the HDR imaging sensor 112 are converted to codeword values by the tone mapper 113 in accordance with a provided tone map 128. A codeword is an integer having a range implied by the bit-depth of the video encoder 114. For example, when the video encoder 114 is configured to operate at a bit-depth of 10-bits, an implied codeword range is from 0 to 1023. Notwithstanding the range implied by the bit-depth, generally a narrower range is used in practice. Use of a narrower range allows non-linear filtering of codeword values without risk of exceeding the implied range.

Two approaches to representing luminance levels are possible: Absolute luminance (AL) and relative luminance (RL).

In the absolute luminance (AL) case, each codeword corresponds to a particular luminance to be emitted from a panel display device 166, forming part of the display device 160. The video encoder 114 maps samples values to codeword values in accordance with viewing condition 126 as indicated by the viewing condition selector 116. In the relative luminance case, the codeword values indicate luminance levels relative to a given ambient light level 124. A specific codeword value (e.g. 64 when 10-bit coding is used) can be used to represent the black level in a given environment (i.e. being in this case the maximum light emission from a display that is indistinguishable from ambient light, and is thus effectively considered to be 'black') and a codeword value (e.g. 940 in a 10-bit coding system) represents the reference white level in a given environment. One example of a situation which draws upon these concepts would be a scene shot during night-time where low levels of lighting provide for a video sequence of substantially low luminance (quite dark). Reproducing such a video on a display exposed to significant light may well deprive the viewer of much detail contained in the video sequence in low light features. In such displays, emitting light beyond the reference white is not possible and thus no additional codewords are available; codewords 1020-1023 are reserved in the Serial Digital Interface (SDI) protocol. The mapping of a given codeword value to a luminance level to be output from the panel device 166 is thus dependent on the environment condition present at the display device 160. In some implementations according to the present disclosure, that environment condition is anticipated by the user of the video camera via the selected viewing condition prior to video capture. The video encoder 114, considering the viewing parameters 134, maps sample values to codeword values such that the comfortable range of luminance levels is not exceeded. For example, in some encoding arrangements, an SEI message referred to as the 'Output Code Map' is inserted into the encoded bitstream 312. This SEI message defines a mapping of decoded codewords to a subsequent sample representation, such as SDI samples. In such arrangements, the Output Code Map is defined such that codewords that would otherwise exceed the maximum comfortable brightness are instead mapped only to the maximum comfortable brightness.

The encoded bitstream 132 is conveyed (e.g. transmitted or passed) to the display device 160. Examples of the display device 160 include an LCD television, a monitor or a projector. The display device 160 includes a video decoder 162 that decodes the encoded bitstream 132 to produce decoded codewords 170. The decoded codewords 170 correspond to the codewords of the mapped image 130, although are not exactly equal due to lossy compression techniques applied in the video encoder 114. The video decoder 162 also decodes metadata from the encoded bitstream 132. The metadata and the decoded codewords 170 are passed to a renderer 164. The renderer 164 uses the metadata to map the decoded codewords 170 to rendered samples 172. The rendered samples 172 are passed as input to the panel display 166 for reproduction, for example to modulate the amount of backlight illumination passing through an LCD panel. The panel device 166 is generally an LCD panel with an LED backlight. The LED backlight may include an array of LEDs to enable a degree of spatially localised control of the maximum achievable luminance. In such cases, the rendered samples 172 are separated into two signals, one for the intensity of each backlight LED and one for the LCD panel. The panel device 166 may alternatively use 'organic LEDs', in which case no separate backlighting is required. Other display approaches such as projectors are also possible, however the principle of a backlight and presence of the panel device 166 remain. The relationship between the decoded codewords 170 and the corresponding light output emitted from each pixel in the panel device 166 is referred to as an EOTF. In the case of a 'reference display' (a display used when mastering content) the EOTF should be strictly adhered to. However for consumer displays, additional signal processing may be present that results in deviation from the EOTF. An example of an EOTF is the ITU-R BT.1886 standard, which defines the EOTF of a cathode ray tube (CRT) display. Note that the output light levels from the EOTF correspond to those reproduced by the panel device 166, known as a 'display referred' representation, and thus are much lower than the corresponding light levels present in the capture environment. Importantly, the EOTF is not the inverse of a corresponding OETF. Collectively, these two functions define an 'optical-to-optical transfer function' (OOTF) that includes a non-linear relationship (in addition to the necessary translation from the scene referred levels to the display referred levels). This non-linear relationship can also be referred to as the 'system gamma' as it approximates a power function of factor 1.2. The reason for this non-linear relationship is that the HVS perceives contrast differently depending on the ambient light level. Thus, to preserve the perceived contrast between the capture environment and the viewing environment, a gamma correction factor is applied.

In one arrangement of the display device 160, the video decoder 162 decodes an ambient viewing parameter message from the encoded bitstream 132. An ambient light level value included in the ambient viewing parameter message indicates the intended viewing ambient light level, e.g. according to the viewing condition selector 116. A light level sensor 163 in the display device 160 detects aspects of the ambient viewing conditions including an ambient illumination 308 (to be described with reference to FIG. 3), output as an ambient light level 171. If the ambient light level value from the ambient viewing parameter message is approximately equal to the ambient light level 171 (e.g. within +/−30%), then no further adaptation of the decoded codewords 170 is required to be performed by the renderer 164. Then, the rendered samples 172 are derived from the decoded codewords 170 by applying a scaling in accordance with a tone-map as signalled in the encoded bitstream 132. One example of this is when the decoded codewords 170 are representative of the light encoded using the PQ EOTF (SMPTE ST.2084) and modulated in accordance with a peak luminance as signalled using SMPTE ST.2086.

For the relative luminance (RL) case, the display device 160 generally includes brightness and contrast controls (which can be automatically controlled and thus not directly exposed to the end user) that enable the user to manually adjust or calibrate the display device 160 such that the decoded codeword values map to the intended luminance levels as required under the current viewing conditions. Generally, calibration is assisted by displaying a test pattern, such as a 'picture line-up generation equipment' (PLUGE) test pattern. The test pattern generates blocks of various colours and shades of gray on the display device 160. Presented shades include black and reference white. A calibration procedure is defined that results in correct setting of the brightness and contrast controls for the viewing environment. For a properly calibrated SDR display, the encoded bitstream 132 will not result in changes in brightness that exceed comfortable viewing levels. For an HDR display, the luminance range can exceed comfortable viewing levels, particularly when the viewing environment is quite dark, which (in the absence of bright content being displayed) results in a substantially dark-adapted HVS.

Absolute luminance (AL) case: Codeword values in the bitstream map to specific luminance levels. In this case, codeword values in the bitstream are mapped to a panel drive signal such that the panel device 166 produces a light level according to the luminance as indicated by the corresponding codeword value and independent of the viewing environment. In one example of an AL display, metadata is included in the encoded bitstream 132 that signals the light levels of black and the reference white in the 'mastering environment'. The mastering environment is the environment in which the content was 'mastered' or colour graded. Different types of content are mastered in different environments. For example, the mastering environment for an on-site live television news broadcast is different (generally equipment in a mobile van) compared to a studio for producing a feature film. Moreover, for consumer content, mastering may not be performed, requiring an encoded bitstream 132 from the capture device 110 that can be directly played on the display device 160 with high quality.

For both the RL and the AL cases, the codeword values may be additionally transformed into a particular colour space in the encoded bitstream 132. Generally, samples from the HDR imaging sensor 112 are representative of red, green and blue (RGB) intensities. Also, light output from the panel device 166 is generally specified as light intensities of light in the provided RGB primaries. As considerable correlation between these three colour components exist, a different colour space is generally used to encode these sample, such as YCbCr. The codeword values thus represent intensities in the YCbCr colour space, with Y representing the luminance, and Cb and Cr representing the chroma components. Other colour spaces may also be used, such as LogLUV and CIELAB, offering the benefit of more uniform spread of perceived colour change across the codeword space used to encode the chroma components.

In an arrangement of the capture device 110 a plurality of viewing conditions are selected by the viewing condition selector 116. In such arrangements, the video encoder 114 produces multiple encoded bitstreams 132, one corresponding to each viewing condition 126. In an alternative variation of this approach, the video encoder 114 may produce one common 'base layer' portion of the encoded bitstream 132, and one set of metadata for each viewing condition 126, with each set of metadata also being present in the encoded bitstream 132. In such arrangements, each set of metadata is separately identified to enable association with the respective viewing condition, to allow the display device 160 to select the metadata appropriate to the viewing conditions.

Figure 2A:
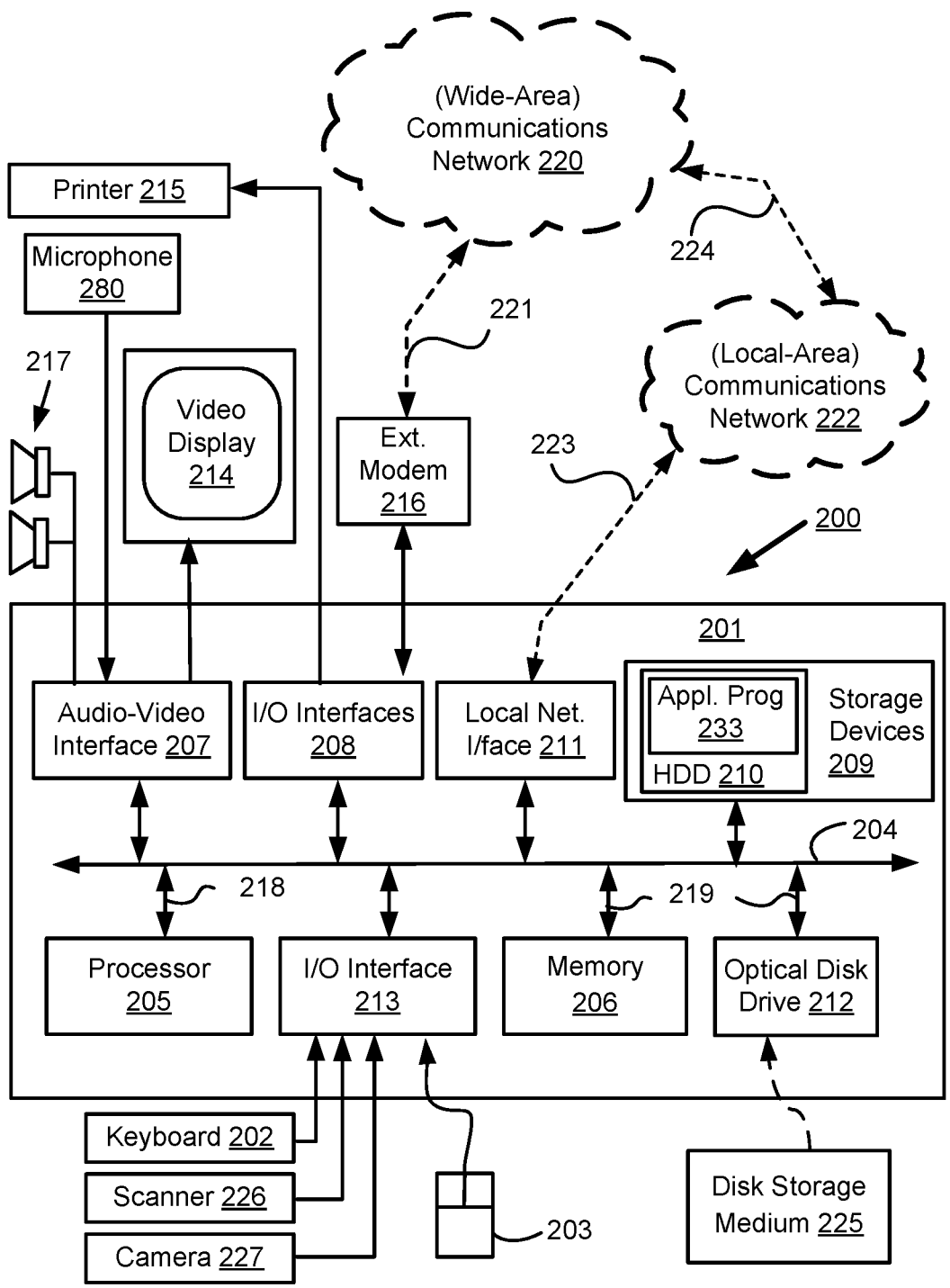
FIGS. 2A and 2B collectively form a schematic block diagram of a general purpose computer system upon which one or both of the video capture device and display device of FIG. 1 may be practiced.

Notwithstanding the example devices mentioned above, each of the source device 110 and display device 160 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a digital video camera 227, which may be configured as the HDR imaging sensor 112, and a microphone 280, which may be integrated with the camera; and output devices including a printer 215, a display device 214, which may be configured as the display device 160, and loudspeakers 217. An external Modulator-Demodulator (Modem) transceiver device 216 may be used by the computer module 201 for communicating to and from a communications network 220 via a connection 221. The communications network 220, which may represent the communication channel 150, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may additionally be provided in the capture device 110 and the display device 160 and the communication channel 150 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the HDR imaging sensor 112, or as a destination for decoded video data to be stored for reproduction via the display 214. The capture device 110 and the display device 160 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 162, as well as methods described below, may be implemented using the computer system 200 wherein the video encoder 114, the video decoder 162 and methods to be described, may be implemented as one or more software application programs 233 executable within the computer system 200. In particular, the video encoder 114, the video decoder 162 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 162 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
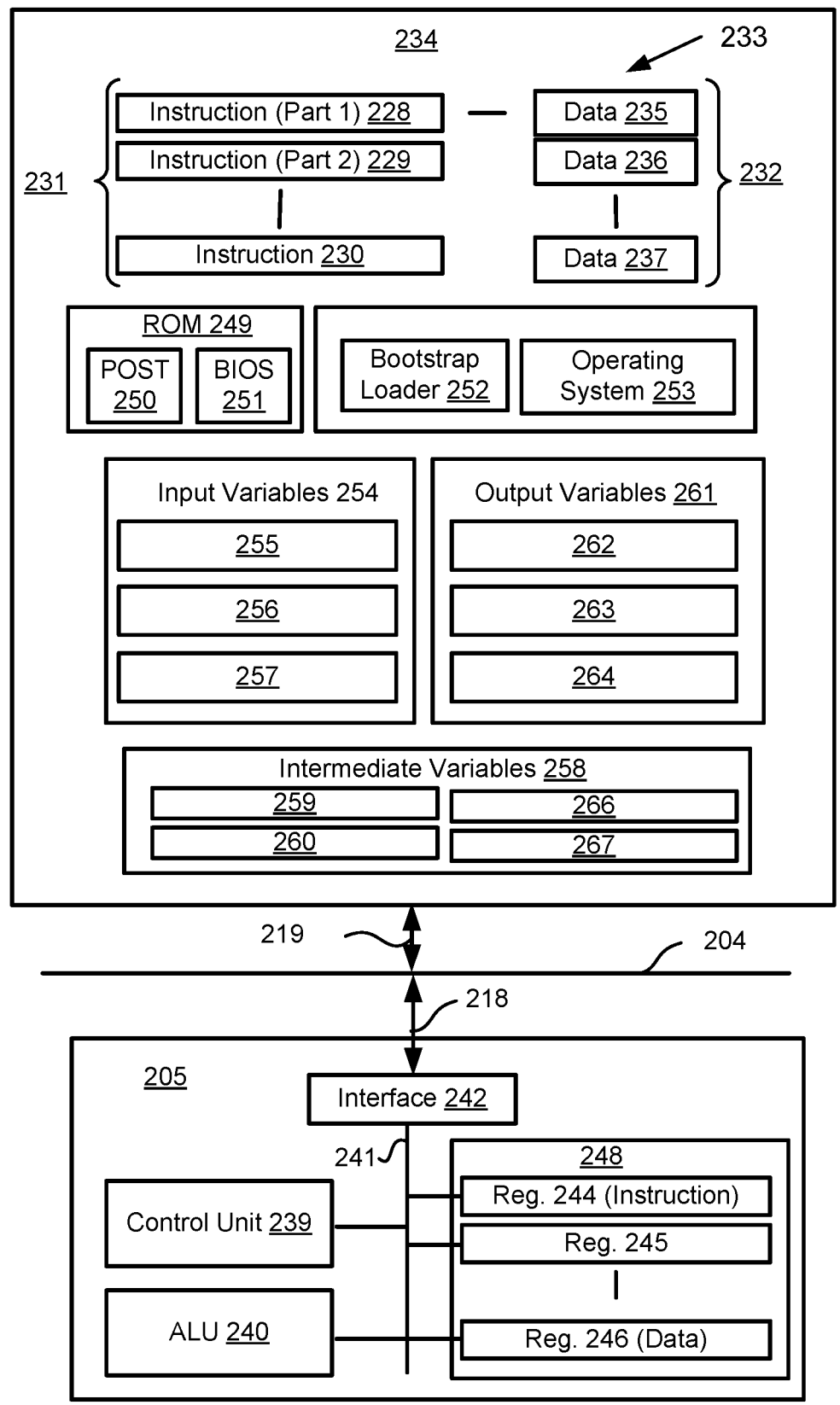

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 162 and the described methods may use input variables 254, which are stored in the memory 234 in corresponding memory locations 255, 256, 257. The video encoder 114, the video decoder 142 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 3:
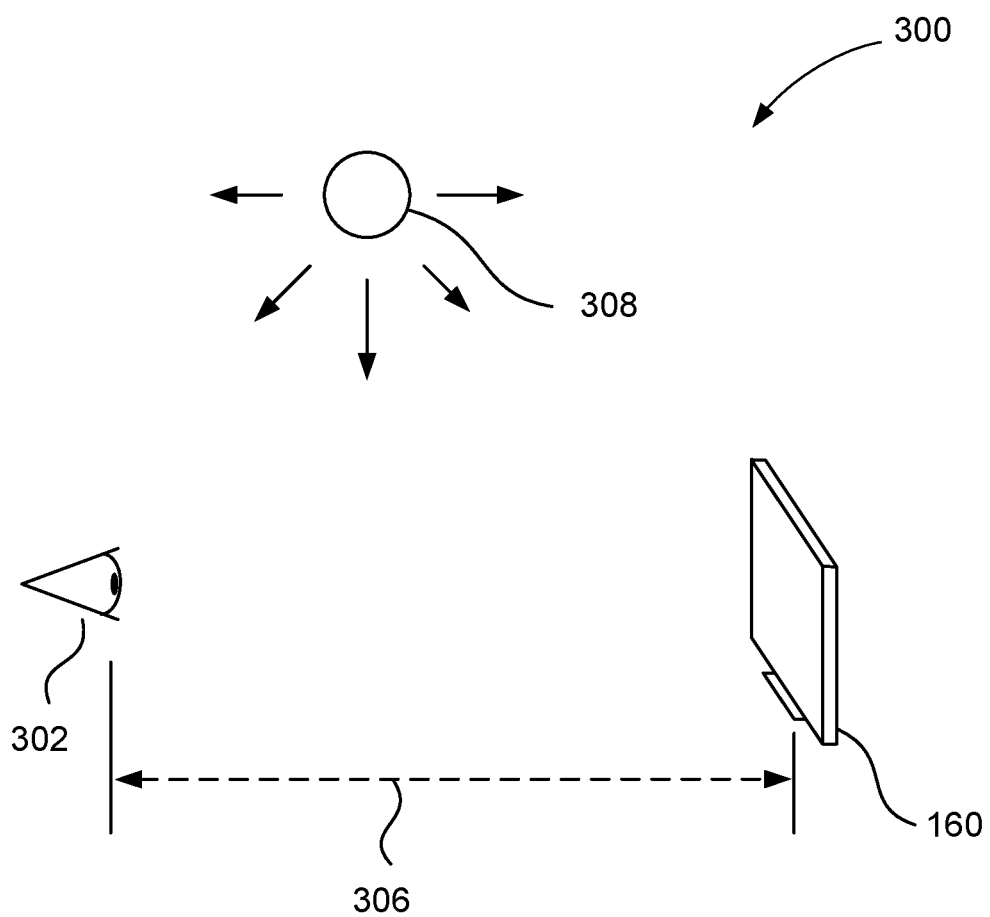
FIG. 3 is a schematic showing an exemplary viewing environment for video display.

FIG. 3 schematically illustrates an exemplary environment for the display device 160. A viewing environment 300 has one or more human observers, e.g. a human observer 302, the display device 160 and ambient illumination 308. The human observer 302 is separated from the display device 160 by a viewing distance 306. The intensity of light subjected to the human observer 302 is a weighted function of the ambient illumination 308 and the light level emitted from the display device 160, attenuated by the viewing distance 306. The HVS in the human observer 302 adapts to the light intensity, affecting the viewing parameters 134. In particular the maximum comfortable luminance level in the HVS model 118 is continually adapting in response to ambient conditions.

Figure 4A:
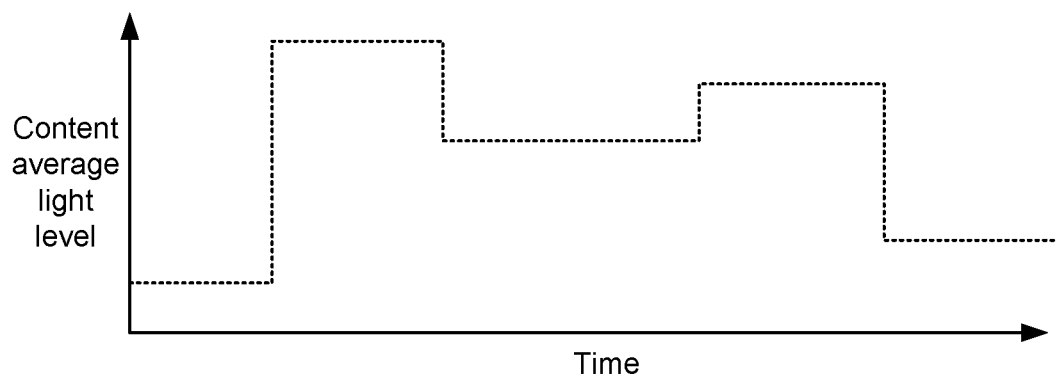
FIGS. 4A, 4B and 4C graphically depict exemplary HVS adaptation to viewing conditions and HDR video data.
Figure 4B:
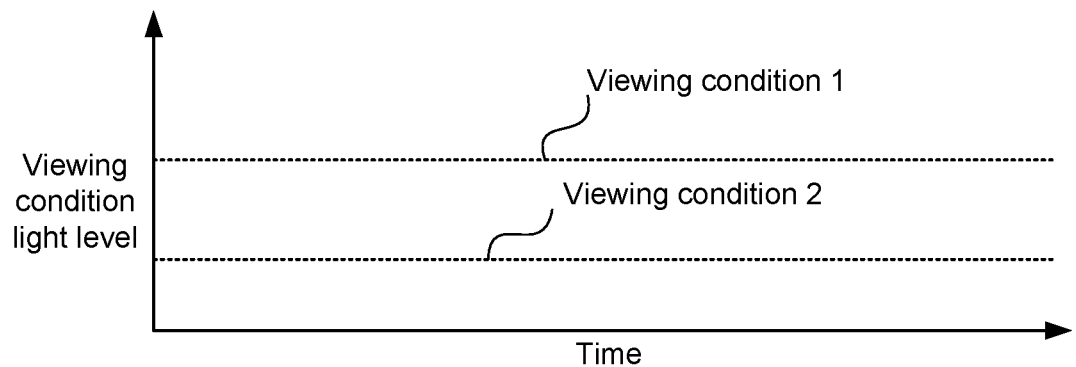
Figure 4C:
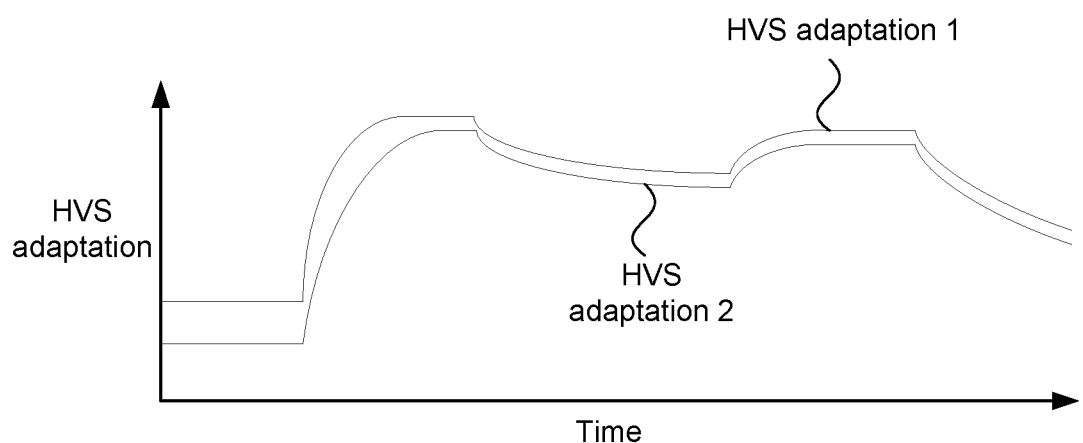

FIGS. 4A, 4B and 4C are diagrams showing examples of relative HVS adaptation to viewing conditions and HDR video data. FIG. 4A shows the average light level of example video data displayed over a time period. In FIG. 4A, the light level is the average of the sample light levels (representative of absolute luminance) over the frame, not the whole video sequence. The averaging calculation may be performed on a frame-by-frame basis, or by using a moving average over a predetermined number of frames, such as for example between 5 and 15 frames. FIG. 4B shows two possible viewing condition light levels for the extended time. FIG. 4C shows two adaptations of the HVS due to the viewing condition light levels of FIG. 4B and the content average light level of FIG. 4A. FIG. 4C shows how the HVS adapts over time to the changing content average light level of FIG. 4A, under two exemplary viewing conditions. Note that adaptation of the HVS to an increase in the content average light level takes less time than adaptation to a decrease in the content average light level.

Figure 5:
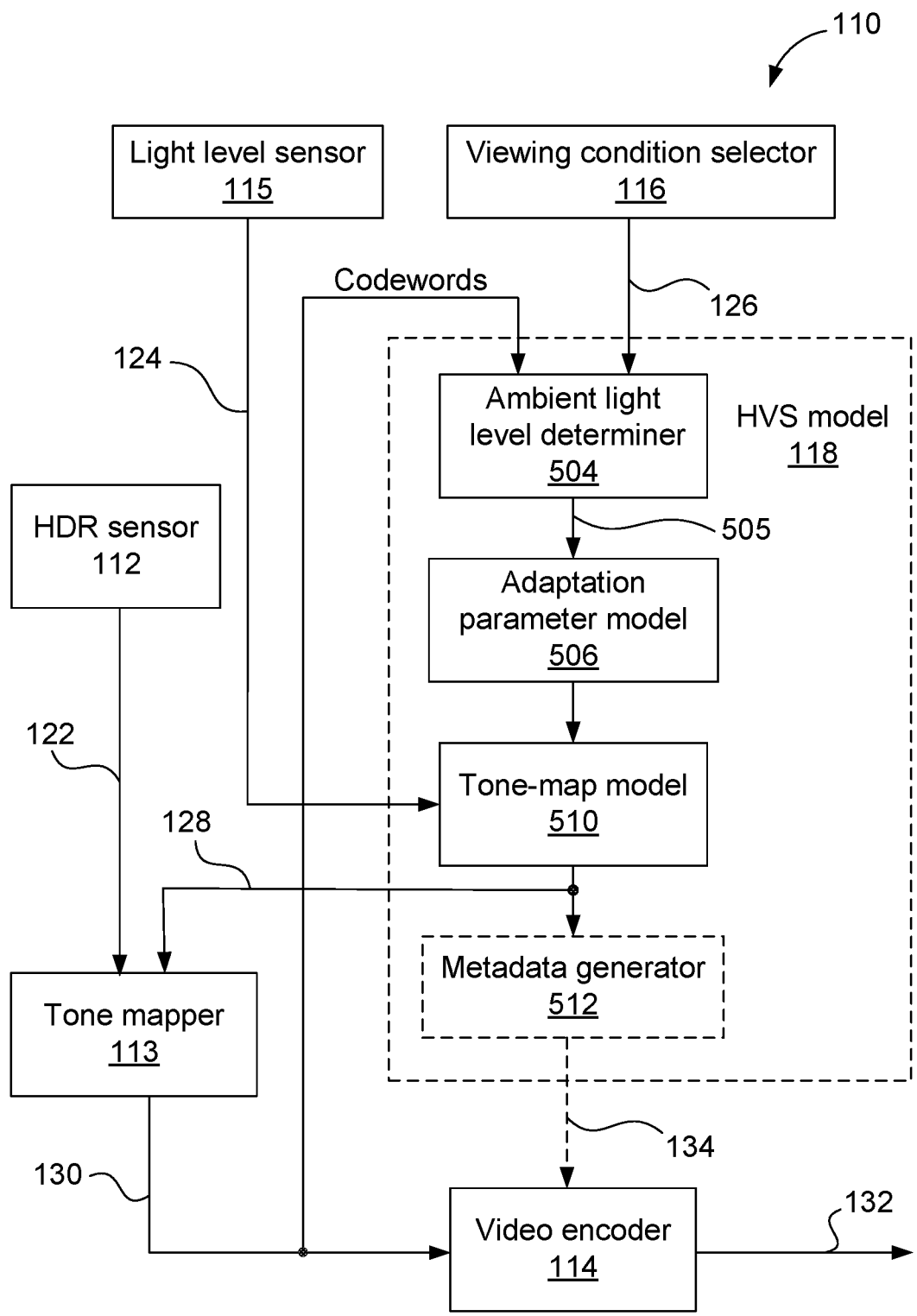
FIG. 5 is a schematic block diagram showing further detail of the video capture device of FIG. 1.

FIG. 5 is a schematic block diagram showing further detail of the HVS model 118 of the video capture device 110 of FIG. 1. As seen in FIG. 5, the HVS model 118 includes a light level determiner 504. The light level determiner 504 determines the unrestricted light level 505 that would be applied to the human observer 302 of FIG. 3 in the absence of further restriction of luminance levels above a threshold. The light level 505 is determined as a weighted average of the light level as captured by the HDR imaging sensor 112 and mapped by the tone mapper 113 as represented by the current codeword 130 (or the average of the codewords of a current frame), and a light level derived from the viewing condition 126 in accordance with the viewing condition selector 116. Thus, the light level 505 is dependent on current inputs to the light level determiner 504 and not prior state information that may be held in the light level determiner 504. For example, the light level determiner 504 produces an output in accordance with the following:

$$L_{output} = \text{average}(PQ^{-1}(\text{codewords}))/d^3 + L_{ambient} \quad (1)$$

where $PQ^{-1}$ is the inverse PQ-EOTF quantisation curve, applied to the codewords 130, averaged across a frame, and adjusted as the cube of the viewing distance 306, i.e. the distance from the human observer 302 to the display device 160. $L_{output}$ is the light level 505, and $L_{ambient}$ is the ambient light level present in the viewing environment.

The values d and $L_{ambient}$ are predetermined, according to the viewing condition 126. Example values are shown in the table below:

| Viewing condition 126 | d | $L_{ambient}$ |
|---|---|---|
| Lounge Room - Day | 2 | 100 |
| Lounge Room - Night | 2 | 10 |
| Home Cinema | 3 | 5 |

As the number of predetermined options for the viewing condition 126 are limited, the light level determiner 504 may also be realised using a look-up table.

The unrestricted light level 505 is passed to an adaptation parameter model 506. The adaptation parameter model 506 (which is temporally dependent, i.e. the model 506 maintains state information) maintains brightness parameters including the maximum comfortable luminance level and the black level for the human observer 302 in the viewing environment 300. Additional parameters, such as the white-point (i.e. under the illuminant in the viewing environment 300) may also be stored in the adaptation parameter model 506. The parameters are updated periodically, e.g. on every frame, once per second, or at some other interval. The HDR image 122 data changes on a frame-by-frame basis, so when updating occurs less than once per frame, averaging across the frames between update operations is performed. The adaptation parameter model 506 has different rates of updating depending on whether the unrestricted light level 505 is greater than the maximum comfortable luminance level, or the unrestricted light level 505 is below the maximum comfortable luminance level.

As seen in FIG. 5, the HVS model 118 includes a tone-map model 510. The tone-map model 510 generates the tone map 128 that relates sample values from the HDR imaging sensor 112 to codeword values 130, suitable for encoding by the video encoder 114. The tone-map model 510 in one implementation uses the ambient light level 124 measured from the light level sensor 115 to generate the map relating sample values from the sensor 115 as absolute luminance levels, to codewords 130, and further uses the adaptation parameter model 506 to map absolute light levels to a range of light levels that accord with the viewing condition 126, as selected by the viewing condition selector 116. Moreover, these two steps of the tone-map model 510 may be coalesced into a single map for reduced implementation cost.

As such, the map may be continuously regenerated, as inputs such as the ambient light level 124 vary over time. This contributes to producing an encoded bitstream 132 that, when viewed using the display device 160, appears visually consistent (i.e. no perceptually significant shifts in the black level or the reference white level) as the scene content changes. Moreover, when high light levels are captured by the HDR imaging sensor 112, those levels are truncated in accordance with the viewing parameters 134 (e.g. the maximum comfortable luminance level). Although this restriction would be perceptible to the human observer 302, it is preferable to the discomfort caused by causing the display device 160 to produce an uncomfortable light level. As the HVS in the human observer 302 adapts (e.g. for a scene change where the brightness level was a step increase compared to the earlier scene), the restriction would gradually be relaxed causing the brightness to increase to the intended level for the viewing condition 300. The tone mapper 113 applies the map 128 from the tone-map model 510 to map sample values from the HDR imaging sensor 112 to codeword values 130. The codeword values 130 are encoded by the video encoder 114 to produce an encoded bitstream 132. The encoded bitstream 132 can also include metadata, generally in the form of one or more SEI messages. The HVS model includes a metadata generator 512 that produces values representative of the black level and the reference white level under the viewing condition 126 as selected by the viewing condition selector 116. This is in contrast to producing values representative of the black level and the reference white level used in the mastering environment.

Figure 8A:
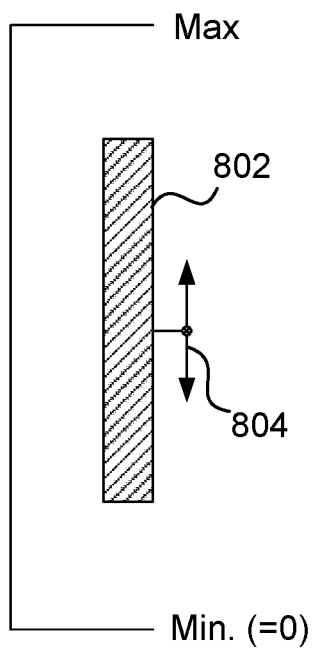
FIGS. 8A to 8C schematically depict various mappings that can be used to account for ambient light and selected viewing conditions.
Figure 8B:
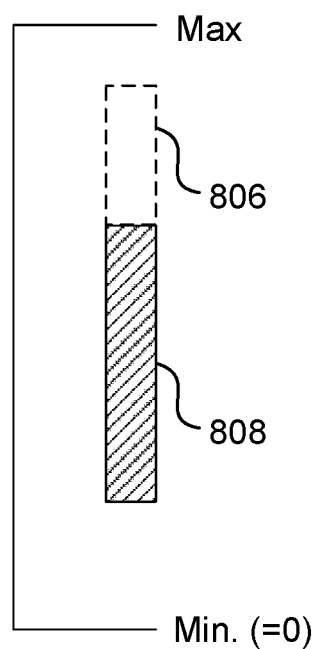
Figure 8C:
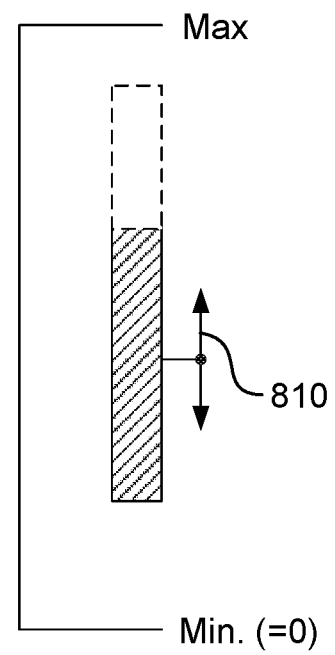

In one particular arrangement, the tone-map model 510 produces a map 128 for which no codeword corresponds to a light level exceeding the maximum comfortable luminance level. Thus, regardless of the input from the HDR imaging sensor 112, the encoded bitstream 132 will not result in the display device 160 producing light levels exceeding the comfortable viewing level of the human observer 302, under the viewing condition 126. The map 128 may 'compress' (in the sense of brightness levels) the captured image by mapping sample values as captured by the HDR imaging sensor 112 into a set of codewords representative of the range of light levels afforded by the maximum comfortable viewing light level. An example of this is seen in FIG. 8A, where the range of intensities available for capture by the HDR camera 110 extend from Min to Max, but the tone map is limited to a fixed range 802 between Min and Max, in accordance with the range afforded by the PQ curve, but such that the tone map may be moved within the range as depicted by the arrows 804 to reflect the conversion of the image from a 'scene referred' space, where light levels in the capture environment have the full dynamic range (of which the capture device 110 can adapt to cover a large portion thereof), to a 'display referred' space, where light levels in the viewing environment have a high dynamic range. Alternatively, the map 128 may 'clip' the image by mapping sample values as captured by the HDR imaging sensor 112 into a set of codewords representative of the range of the light levels afforded by the viewing condition 126. An example of this is seen in FIG. 8B where the mapping 806, which has wider range than the mapping 802, is truncated to a mapping 808 having a relatively smaller range. Such a mapping generally preserves the black level, such that a black light level in the capture environment maps to the black level under the selected viewing condition 126. However, such a mapping does not utilize the full range afforded by the PQ curve. Where a sample value from the HDR imaging sensor 112 corresponds to a codeword representative of a light level greater than the maximum comfortable viewing light level (the 'maximum safe codeword'), a codeword not exceeding the maximum safe codeword is used instead, e.g. by performing a clipping operation during generation of the map. An example of this is seen in FIG. 8C which shows the mapping 808 of FIG. 8B able to move in a manner akin to that the mapping of FIG. 8A. In these ways, the mapping applied to the captured intensities is dynamically adjusted to fall within the viewing conditions expected to prevail at the time of intended reproduction.

To avoid discontinuities resulting from clipping codewords above a particular level, a smoothing may be further applied when generating the tone map 128. Then, light levels approaching the maximum safe codeword will start to be reduced, smoothly reaching the maximum safe codeword and resulting in less visible artefacts to the human observer 302. An example of this is depicted in FIG. 7B by the dotted curve 730 which shows, with some amount of exaggeration, a smoothed transition to an adjusted maximum safe codeword.

FIG. 5 depicts two implementations of the capture device 110. The first, as described above operates upon values contained in and conveyed by the codewords ultimately being encoded into the bitstream 132.

In the second implementation, depicted using dashed lines in FIG. 5, the tone-map model 510 produces a tone-map 128 that maps samples from the HDR imaging sensor 112 into an SDR range. The tone-map 128 is input to a metadata generator 512 which generates a message, conveyed as metadata, that includes values representative of the peak and average luminance, thereby forming part of the viewing parameters 134 of FIG. 1. These viewing parameters 134 are also encoded into the bitstream 132 by the encoder 114 and used by the display device 160 to produce an HDR image. In such arrangements, the peak and average luminance levels signalled in the encoded bitstream 132 are adapted by parameters from the adaptation parameter model 506 such that the reproduced HDR image does not exceed comfortable viewing limits.

Figure 6:
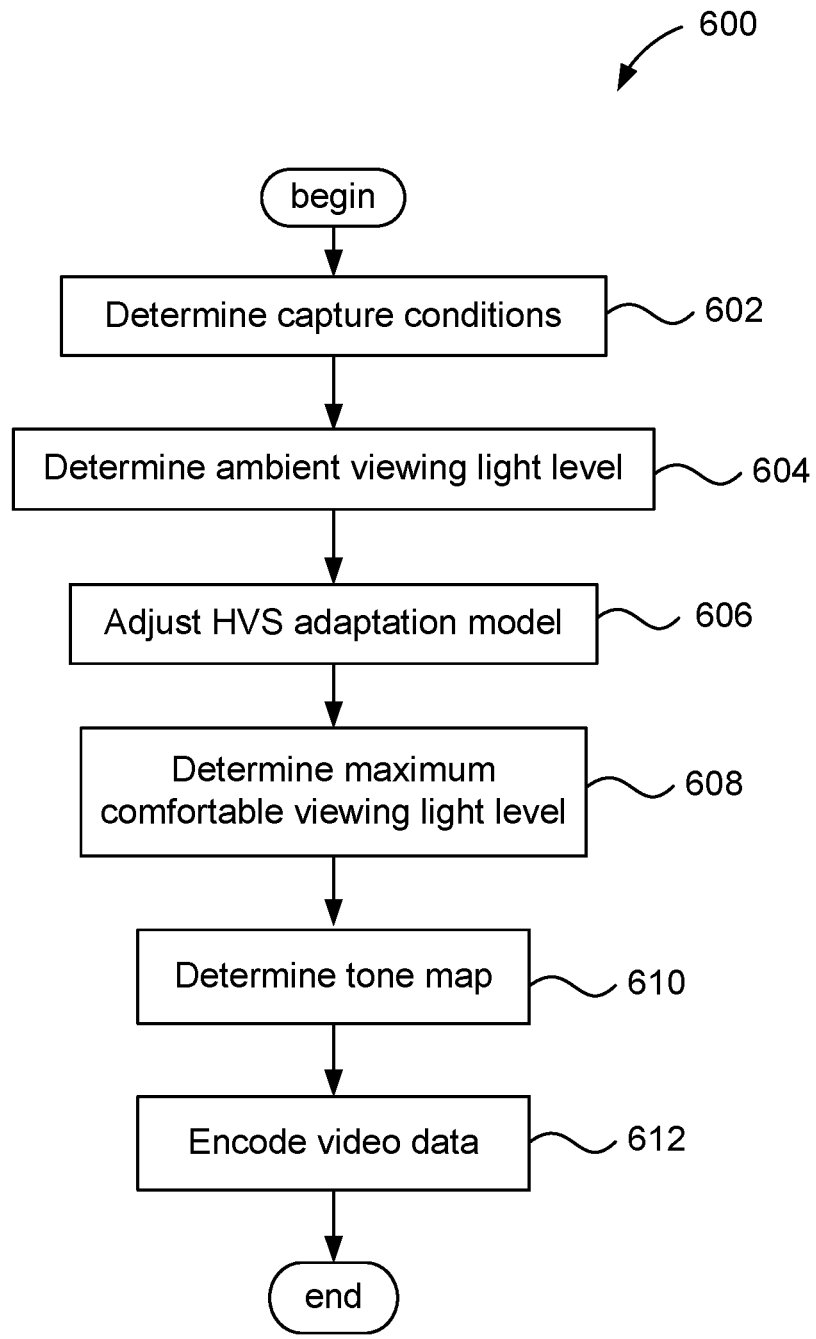
FIG. 6 is a schematic flow diagram showing a method for encoding HDR video data for a particular viewing condition.

FIG. 6 is a schematic flow diagram showing a method 600 for encoding HDR video data for a particular viewing condition 126. A capture device 110 performing the method 600 produces an encoded bitstream 132 that can be decoded as video data (or 'content') and displayed on the display device 160. Importantly, such content would generally not be processed in a colour grading workflow, e.g. the content may be home video or other 'user-generated content' that is captured and directly distributed without a colour grading process. SDR capture devices typically adapt their sensitivity to widely ranging input using 'auto ISO' algorithms, however these produce low quality output as lighting conditions in the capture environment vary. For example, when capturing indoors during daytime and panning past a window the ISO is rapidly adjusted, to avoid over-exposure of the portion of the image showing the window. Rapid adjustment of the ISO setting is required because the sensor has limited dynamic range. The resulting video has poor quality. The capture device 110 can capture HDR video data and thus does not require such extensive (or any) ISO adjustment. Instead, an ambient light level meter is used to determine ambient conditions against which samples in the HDR video data 122 are interpreted. Then, the brightness of the captured video data would vary widely, e.g. when the user pans the camera past a bright object (e.g. a window). The method 600 provides necessary attenuation of sharp increases in brightness to avoid viewer discomfort, without any intermediate processing of the encoded bitstream 132 being required.

The method 600 may be implemented in software in the computer system 200, for example stored in the HDD 210 and executable by the processor 205 using HDR video image data captured by the camera 227. Alternatively, the method 200 may be performed using video camera configured according to the capture device 110 of FIG. 1 having corresponding hardware and/or software functional modules.

The method 600 starts with a determine capture conditions step 602. At the determine capture conditions step 602, the capture device 110, under control of the processor 205, determines the capture conditions under which the video data is being captured. The light level sensor 115, under control of the processor 205, is used to measure the ambient light level 124 in the capture environment. This measurement provides a baseline light level against which the image from the HDR imaging sensor 112 can be interpreted. In particular, the ambient light level 124 is used to derive the black level for the image from the HDR imaging sensor 112.

At a determine ambient viewing light level step 604, the capture device 110, under control of the processor 205, determines the ambient viewing light level in the viewing environment 300. This ambient light level is determined from the ambient light expected in the viewing environment 300. This ambient light level is derived from the viewing condition 126 and a setting of the viewing condition selector 116. When deriving the tone-map 128 for mapping sample values 122 to codewords 130, the ambient light level 124 can be used instead of the average light level within the frame (or averaged across multiple frames). This provides a more stable tone-map 128, i.e. a map less reactive to variances in the captured data.

In the example implementation of FIG. 1, the tone mapper 113 and light level sensor 115 together form a determination arrangement for determining the capture conditions for the capture device 110 performed in steps 602 and 604, such that the capture conditions include the ambient capture light level 124 and the measured light level 130 of captured video data 122.

Control in the processor 205 then passes to an adjust HVS adaptation model step 606.

At the adjust HVS adaptation model step 606, under control of the processor 205, the HVS model 118 is adjusted. The HVS model 118 includes a model of the HVS of the human observer 302 (the 'human observer model). This model is updated based upon the ambient light level (e.g. 505) under the viewing condition 126 as selected by the viewing condition selector 116 and the light level expected to be emitted from the display device 160. This light level is derived based upon an average frame light level relative to the light level detected by the light level sensor 115 and the maximum comfortable viewing brightness. The maximum comfortable viewing brightness is used here to model a clipping of peak brightness emitted from the display device 160 such that the human observer model remains within comfortable viewing limits, i.e. that the emitted light levels do not exceed the maximum comfortable viewing light level. The average frame light level is derived from the sample values from the HDR imaging sensor 112. In the example of FIG. 1, the HVS model 118 operates as an adjusting unit by which the model 506 is adjusted based on at least the measured light level 130 and the ambient capture light level 124, and additionally using the selected viewing condition 126.

Control in the processor 205 then passes to a determine maximum comfortable viewing light level step 608. At the determine maximum comfortable viewing light level step 608, the HVS model 118, under control of the processor 205, determines viewing parameters 134, including the maximum comfortable viewing light level. A next adaptation level is computed using a current adaptation level and an observed light level. The observed light level is a weighted average of the ambient light level in the viewing environment 300 and the emitted light level from the display device 160, adjusted according to the viewing distance implied by the viewing condition 126. The next adaptation level is then assigned to the current adaptation level, and stored in the memory 206.

Control in the processor 205 then passes to a determine tone-map step 610. At the determine tone-map step 610, the HVS model 118, under control of the processor 205, operates as a modeller to determine the tone-map 128 for the current frame of video data 122. The tone-map 128 is determined such that no sample value will map to a light level that would exceed the maximum comfortable viewing light level. Tone maps are discussed further with reference to FIGS. 7A and 7B.

Control in the processor 205 then passes to an encode video data step 612. At the encode video data step 612, the video encoder 114, under control of the processor 205, encodes codeword values to produce an encoded bitstream 132. The codewords are derived from the sample values using the tone-map determined in the step 610. The method 600 then terminates.

Figure 7A:
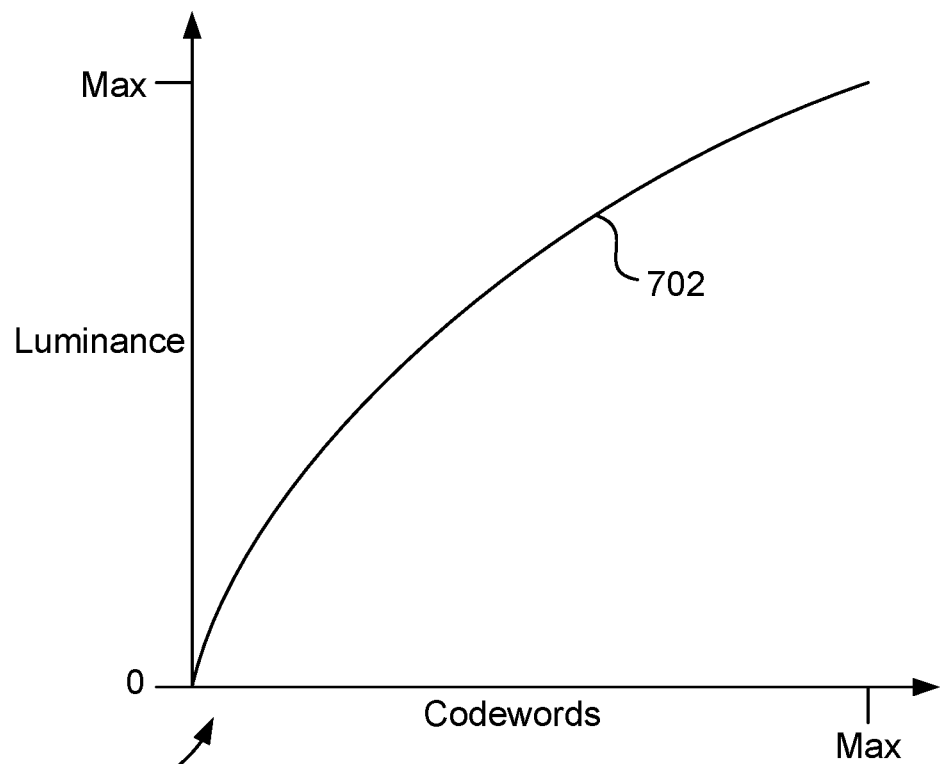
FIGS. 7A and 7B graphically represent transfer functions.
Figure 7B:
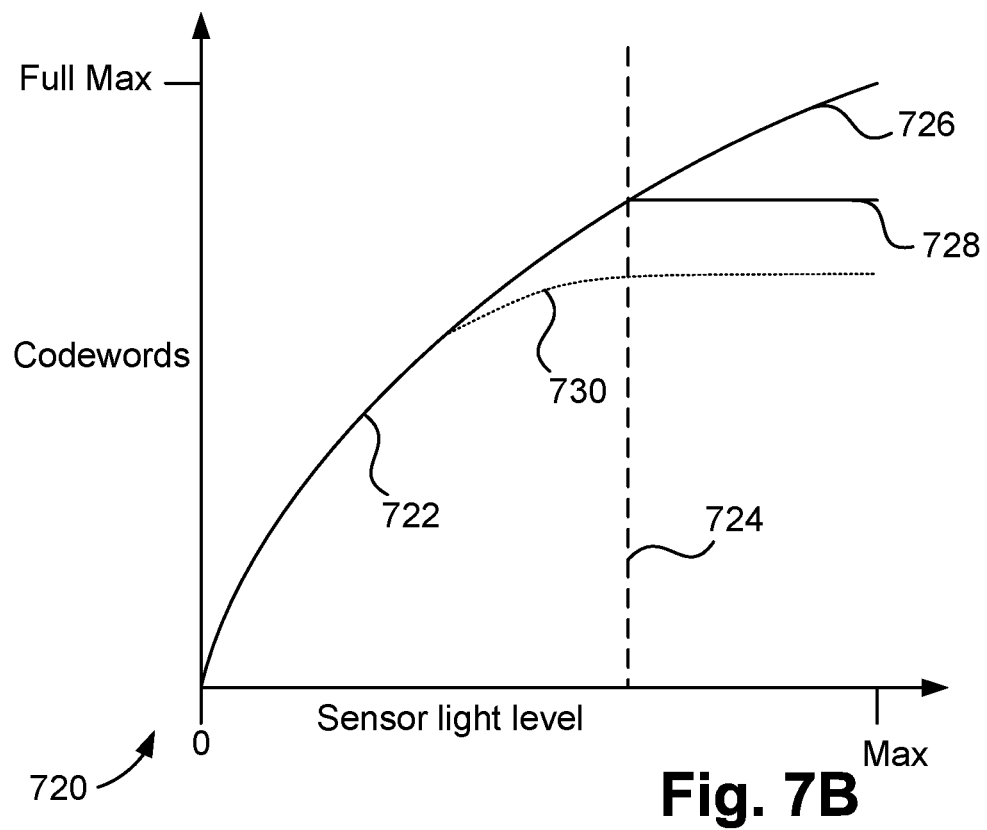

FIGS. 7A and 7B schematically show transfer functions associated with codewords. Transfer function 700 of FIG. 7A includes a nonlinear map 702 of codewords, e.g. 10-bit precision, onto a set of absolute light levels, e.g. from 0 to 10,000 candela/metre$^2$. In an 'absolute luminance' system, when the display device 160 uses the transfer function 700, the renderer 164 operates such that decoded codewords 170 result in luminance levels from the panel device 116 according to the nonlinear map 702. As such systems make no allowance for variations in the viewing environment 300, the encoded bitstream 132 resulting from the HVS model in the capture device 110 offers improved subjective quality for the human observer 302.

Transfer function 720 of FIG. 7B shows a tone map between sensor light levels and codewords with clipping to avoid codewords that would exceed a maximum capture brightness 724. The maximum capture brightness 724 is the brightness in the capture environment that corresponds to the maximum comfortable viewing brightness of the viewing environment 300. The maximum capture brightness 724 changes as the HVS model 118 is updated and, as illustrated, can be less than the maximum brightness detectable by the sensor 112 after conversion from the scene referred representation to the display referred representation (i.e., the first step of the tone map 128). An unclipped portion 722 of the tone map provides a mapping between brightness levels as detected by the HDR imaging sensor 112 and codewords. A maximum codeword 728 illustrates the codeword not exceeded (clipped value) by the tone map when brightness levels exceed the maximum capture brightness 724, representative of the brightness range limited output of the capture device 110. As previously noted, the smoothed transition 730 may be further applied to reduce human perceptible artefacts. FIG. 7B assist in depicting that the preselected viewing condition is one of a plurality of viewing conditions each having associated light level, preferably ranging from a most conservative level, corresponding to total darkness (light level of 0), to a most restrictive level in which a tone mapping output never exceeds a threshold (728). The tone mapping rate of change is desirably limited (curve 730) when approaching the threshold 728.

The various mappings shown in FIGS. 7A and 7B may be readily implemented using look-up tables of values, since memory demands are not high. Further, user selection of viewing conditions 116 may result in one or more different look-up tables being selected to perform the various mappings.

In a further arrangement of the capture device 110, the tone-map 128 is not dependent upon the adaption parameters of the HVS model 118. In such arrangements, an SEI message is included in the bitstream 132 that includes a map for converting decoded samples to a different sample representation, such as SDI codewords. For example, an 'Output code Map' SEI message may be used to convey a tone-map selected by the capture device 110 and intended for use in the display device 160. When the maximum average light level for the video data would exceed the maximum comfortable viewing light level, the value stored in the SEI message is attenuated so that the final rendering in the display device 160 does not cause discomfort to viewers. As each frame is encoded in the encoded bitstream 132 by the video encoder 114, an additional SEI message may also be included (e.g. if the parameters to be stored differ from previously sent parameters). The Output code Map SEI message support specification of a map of codewords 130 to SDI sample values as a piecewise linear model with from one to 33 segments. This is sufficient to model a curve, such as the curve of FIG. 7A or 7B with a high degree of precision. In such arrangements, the mapping only has effect in implementations that convert from the codeword values (e.g. as passed along an HDMI interface) to values for propagation through the SDI format.

In another arrangement of the capture device 110, an encoded bitstream 132 is produced by the video encoder 114 that includes metadata to assist with viewing under multiple viewing conditions. In such arrangements, multiple Output Code Map SEI messages may be generated, each having an association with a particular viewing condition (e.g. an extra syntax element to act as an identifier is included in the message). In such arrangements, the viewing condition selector 116 may be omitted and instead a fixed set of viewing conditions can be used. Moreover, in such arrangements, one tone-map and one set of codewords may be stored in the encoded bitstream 132, with multiple sets of SEI messages (one set per viewing condition).

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

For example, in further implementations, the metadata 134 encoded into the bitstream 132 may include a representation of the selected viewing condition 126 to thereby enable the display device 160 to directly ascertain the intended viewing condition at the time of image capture and, where appropriate, configure or seek to adapt one or both of the reproduction and the viewing environment to match as closely as possible, the intended viewing condition. With respect to adapting the reproduction, a light sensor may be used by the display device 160 to detect ambient light, which can then be used by the display device to locally adjust the display brightness to thereby complement the intention of the person who captured the video. For example, where the video was captured in the "Home Cinema" setting discussed above, but reproduction nevertheless occurred in a relatively bright room (e.g. the Lounge Room during daylight hours), the display device 160 may compensate for this by generally increasing the brightness of the display. With respect to adapting the viewing environment, the decoded viewing condition may be used as an input to a home automation system to adjust the environment as best possible to replicate the intended conditions. Again using the example "Home Cinema" captured video reproduced in the Lounge Room during daytime, this may involve turning off any lights, and closing any blinds or curtains to reduce the impact of natural light, to best emulate the cinema environment.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method for encoding video data into a video bitstream using a video capture device, the method comprising:
   determining capture conditions for the capture device, the capture conditions including an ambient capture light level and a light level of captured video data;
   adjusting a brightness adaptation model using at least the light level of the captured video data and the ambient capture light level, the brightness adaptation model defining, based on a human visual system, a temporally variable peak luminance acceptable for a viewer of video captured using the capture device, wherein the temporally variable peak luminance changes in response to adjusting the brightness adaptation model;
   determining, in a case where the light level of the captured video data exceeds a maximum light level determined in accordance with the temporally variable peak luminance defined by the brightness adaptation model, a tone map by reducing brightness defined by the tone map; and
   encoding captured video data into the video bitstream using the determined tone map.

2. The method according to claim 1, wherein the brightness adaptation model includes a viewing environment light level.

3. The method according to claim 1, wherein the brightness adaptation model includes a plurality of viewing environment light levels.

4. The method according to claim 1, wherein the brightness adaptation model includes a plurality of viewing environment light levels, and the video bitstream includes a plurality of metadata elements, each metadata element indicating the maximum brightness under one viewing environment light level of the plurality of viewing environment light levels.

5. The method according to claim 1, wherein the capture device is a high dynamic range (HDR) digital video camera.

6. The method according to claim 1, wherein the encoding comprises:
   applying the tone map to the captured video data to form mapped image data; and
   encoding the mapped image data into the bitstream.

7. The method according to claim 1, wherein the encoding comprises:
   applying the tone map to the captured video data to form mapped image data; and
   encoding the mapped image data into the bitstream; and wherein
   the light level of the captured video data is derived from the mapped image data.

8. The method according to claim 1, wherein a preselected viewing condition is selected at the video capture device before video capture to associate the captured video data with an expected reproduction environment in which the captured video data may be reproduced.

9. The method according to claim 1, wherein a preselected viewing condition is selected at the video capture device before video capture to associate the captured video data with an expected reproduction environment in which the captured video data may be reproduced, and the determining of the tone map comprises at least one of:
   (i) forming a tone-map model to map the ambient capture light level obtained from a light sensor of the capture device to absolute luminance levels;
   (ii) using the brightness adaptation parameter model to map absolute light levels to a range of light levels that accord with the preselected viewing condition.

10. The method according to claim 1, wherein a preselected viewing condition is selected at the video capture device before video capture to associate the captured video data with an expected reproduction environment in which the captured video data may be reproduced, and the determining of the tone map comprises at least one of:
    (i) forming a tone-map model to map the ambient capture light level obtained from a light sensor of the capture device to absolute luminance levels;
    (ii) using the brightness adaptation parameter model to map absolute light levels to a range of light levels that accord with the preselected viewing condition;
    wherein the preselected viewing condition is one of a plurality of viewing conditions each having an associated light level preferably ranging from a most conservative level, corresponding to total darkness, to a most restrictive level in which a tone mapping rate of change never exceeds a threshold.

11. The method according to claim 1, wherein a preselected viewing condition is selected at the video capture device before video capture to associate the captured video data with an expected reproduction environment in which the captured video data may be reproduced, and the determining of the tone map comprises at least one of:
    (i) forming a tone-map model to map the ambient capture light level obtained from a light sensor of the capture device to absolute luminance levels;
    (ii) using the brightness adaptation parameter model to map absolute light levels to a range of light levels that accord with the preselected viewing condition;
    wherein the preselected viewing condition is one of a plurality of viewing conditions each having an associated light level preferably ranging from a most conservative level, corresponding to total darkness, to a most restrictive level in which a tone mapping rate of change never exceeds a threshold, and the tone mapping rate of change is limited when approaching the threshold.

12. The method according to claim 1, wherein a preselected viewing condition is selected at the video capture device before video capture to associate the captured video data with an expected reproduction environment in which the captured video data may be reproduced, and the method further comprises encoding the preselected viewing condition into the bitstream.

13. A non-transitory computer readable storage medium having a program recorded thereon, the program being executable by a processor of a video capture device to encode video data into a video bitstream, the program comprising code to perform the steps of:

determining capture conditions for the capture device, the capture conditions including an ambient capture light level and a light level of captured video data;

adjusting a brightness adaptation model using at least the light level of the captured video data and the ambient capture light level, the brightness adaptation model defining, based on a human visual system, a temporally variable peak luminance acceptable for a viewer of video captured using the capture device, wherein the temporally variable peak luminance changes in response to adjusting the brightness adaptation model;

determining, in a case where the light level of the captured video data exceeds a maximum light level determined in accordance with the temporally variable peak luminance defined by the brightness adaptation model, a tone map by reducing brightness defined by the tone map; and encoding captured video data into the video bitstream using the determined tone map.

14. A video capture device, said video capture device comprising one or more processors executing instructions that, when executed by the one or more processors, cause the one or more processors to function as:

a determination arrangement for determining capture conditions for the capture device, the capture conditions including an ambient capture light level and a light level of captured video data;

an adjusting unit for adjusting a brightness adaptation model using at least the light level of the captured video data and the ambient capture light level, the brightness adaptation model defining, based on a human visual system, a temporally variable peak luminance acceptable for a viewer of video captured using the capture device, wherein the temporally variable peak luminance changes in response to adjusting the brightness adaptation model;

a modeller for determining, in a case where the light level of the captured video data exceeds a maximum light level determined in accordance with the temporally variable peak luminance defined by the brightness adaptation model, a tone map by reducing brightness defined by the tone map; and an encoder for encoding captured video data into the video bitstream using the determined tone map.

15. The video capture device according to claim 14, wherein the brightness adaptation model includes at least one viewing environment light level, and the video bitstream includes at least one metadata element, each metadata element indicating the maximum brightness under one viewing environment light levels of the viewing environment light levels.

16. The video capture device according to claim 14, wherein the encoding comprises:

applying the tone map to the captured video data to form mapped image data; and encoding the mapped image data into the bitstream; and the light level of the captured video data is derived from the mapped image data.

17. The video capture device according to claim 14, wherein a preselected viewing condition is selected at the video capture device before video capture to associate the captured video data with an expected reproduction environment in which the captured video data may be reproduced.

18. The video capture device according to claim 14, wherein the determining of the tone map comprises at least one of:

(i) forming a tone-map model to map the ambient capture light level obtained from a light sensor of the capture device to absolute luminance levels;

(ii) using the brightness adaptation parameter model to map absolute light levels to a range of light levels that accord with the preselected viewing condition;

wherein the preselected viewing condition is one of a plurality of viewing conditions each having associated light level preferably ranging from a most conservative level, corresponding to total darkness, to a most restrictive level in which a tone mapping rate of change never exceeds a threshold;

wherein the tone mapping rate of change is limited when approaching the threshold.

19. The video capture device according to claim 14, wherein the encoder encodes the preselected viewing condition into the bitstream.

20. The video capture device according to claim 14, wherein the captured video data is encoded into the video bitstream along with metadata that encodes the determined tone map.

* * * * *